United States Patent
Akbar et al.

(10) Patent No.: US 10,728,243 B2
(45) Date of Patent: Jul. 28, 2020

(54) AUTOMATING ESTABLISHMENT OF INITIAL MUTUAL TRUST DURING DEPLOYMENT OF A VIRTUAL APPLIANCE IN A MANAGED VIRTUAL DATA CENTER ENVIRONMENT

(71) Applicant: VMware, Inc., Palo Alto, CA (US)

(72) Inventors: Muhammad Akbar, Palo Alto, CA (US); Adith Sudhakar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 250 days.

(21) Appl. No.: 15/873,876

(22) Filed: Jan. 17, 2018

(65) Prior Publication Data

US 2019/0222574 A1   Jul. 18, 2019

(51) Int. Cl.
*H04L 29/06*   (2006.01)
*G06F 9/455*   (2018.01)
*G06F 8/60*   (2018.01)

(52) U.S. Cl.
CPC .......... *H04L 63/0869* (2013.01); *G06F 8/60* (2013.01); *G06F 9/45558* (2013.01); *H04L 63/0428* (2013.01); *H04L 63/061* (2013.01); *H04L 63/0823* (2013.01); *G06F 2009/45562* (2013.01); *G06F 2009/45587* (2013.01)

(58) Field of Classification Search
CPC ............. H04L 63/0869; H04L 63/0428; H04L 63/061; H04L 63/0823; G06F 8/60; G06F 9/45558; G06F 2009/45562; G06F 2009/45587
See application file for complete search history.

(56) References Cited

U.S. PATENT DOCUMENTS

| | | | | |
|---|---|---|---|---|
| 10,154,023 | B1* | 12/2018 | Nossik | G06F 21/575 |
| 2009/0259759 | A1* | 10/2009 | Miyajima | H04L 63/0272 709/229 |
| 2012/0265976 | A1* | 10/2012 | Spiers | H04L 63/0218 713/2 |
| 2014/0123230 | A1* | 5/2014 | Farina | G06F 21/53 726/4 |
| 2014/0380310 | A1* | 12/2014 | Wei | G06F 9/45558 718/1 |
| 2015/0220709 | A1* | 8/2015 | Jung | G06F 21/45 713/155 |

(Continued)

OTHER PUBLICATIONS

Anonymous, "Secure Remote Password protocol," Wikipedia, 7 pages, retrieved on Apr. 17, 2018 from https://en.wikipedia.org/w/index.php?title=Secure_Remote_Password_protocol&oldid=836669408.

(Continued)

*Primary Examiner* — Sarah Su
(74) *Attorney, Agent, or Firm* — Patterson + Sheridan, LLP

(57) ABSTRACT

System and method for securely deploying a virtual machine in a data center is disclosed. In one embodiment, public keys are established between the requesting virtual machine and the deployed virtual machine, so that authentication and communication between the machines can occur using the public keys. In another embodiment, a secret private key is established between the requesting virtual machine and the deployed virtual machine using a password authenticated key exchange protocol. Authentication and communication between the machines is then established using the secret private key.

16 Claims, 4 Drawing Sheets

(56) References Cited

U.S. PATENT DOCUMENTS

| | | | | |
|---|---|---|---|---|
| 2015/0264026 | A1* | 9/2015 | Firth | G06F 16/13 |
| | | | | 726/4 |
| 2016/0080474 | A1* | 3/2016 | Argenti | H04L 67/10 |
| | | | | 709/201 |
| 2017/0054565 | A1* | 2/2017 | Feng | H04L 9/32 |
| 2017/0099188 | A1* | 4/2017 | Chang | H04L 12/4633 |
| 2017/0235951 | A1* | 8/2017 | Harrison | G06F 21/51 |
| | | | | 726/24 |
| 2017/0295195 | A1* | 10/2017 | Wettstein | H04L 9/0897 |
| 2019/0065232 | A1* | 2/2019 | Do | G06F 8/60 |

OTHER PUBLICATIONS

Bellovin et al. "Encrypted Key Exchange: Password-Based Protocols Secure Against Dictionary Attacks," Proceedings of the IEEE Symposium on Research in Security and Privacy, Oakland, CA, USA, May 1992, 13 pages.

Boyd, M. "Protocols for Authentication and Key Establishment— Chapter 7: Password-Based Protocols," Springer-Verlag, 2010, pp. 248-288.

Steiner et al. "Secure Password-Based Cipher Suite for TLS," ACM Transactions on Information Security, vol. 4, No. 2, May 2001, pp. 134-157.

Tanenbaum et al. "Distributed Systems: Principles and Paradigms," Pearson/Prentice Hall, 2nd Edition, Oct. 12, 2006, 705 pages.

Taylor et al. "Using the Secure Remote Password (SRP) Protocol for TLS Authentication," Network Working Group, Request for Comments 5054 (RFC 5054), Nov. 2007, pp. 1-24.

Wu et al. "SRP-6: Improvements and Refinements to the Secure Remote Password Protocol," Arcot Systems, Oct. 29, 2002, pp. 1-5.

* cited by examiner

AUTOMATING ESTABLISHMENT OF INITIAL MUTUAL TRUST DURING DEPLOYMENT OF A VIRTUAL APPLIANCE IN A MANAGED VIRTUAL DATA CENTER ENVIRONMENT

BACKGROUND

As cloud computing becomes more affordable every year, the demand of software defined data centers in the cloud is on the rise. Rolling out a new data center for a customer involves deploying a plethora of management software typically bundled as virtual appliances. These virtual appliances, which are usually in the form of virtual machines, are stored in centralized storage and are accessed and deployed during data center creation which is typically done by a deployment and bring-up script.

A typical deployment environment starts with the appliances connected only to an isolated network. This assumption becomes the foundation for developer's confidence that such a setup is not vulnerable and hence establishing trust is ignored at the first step. After the first step, proper security is established for the deployed appliances and communications with the deployed appliances is then secure. However, the first step in the initial deployment of virtual appliances in the data center as well as in the later deployment of new virtual appliances, leaves a gap in security. It is important to close this gap in security.

DETAILED DESCRIPTION

Figure 1:
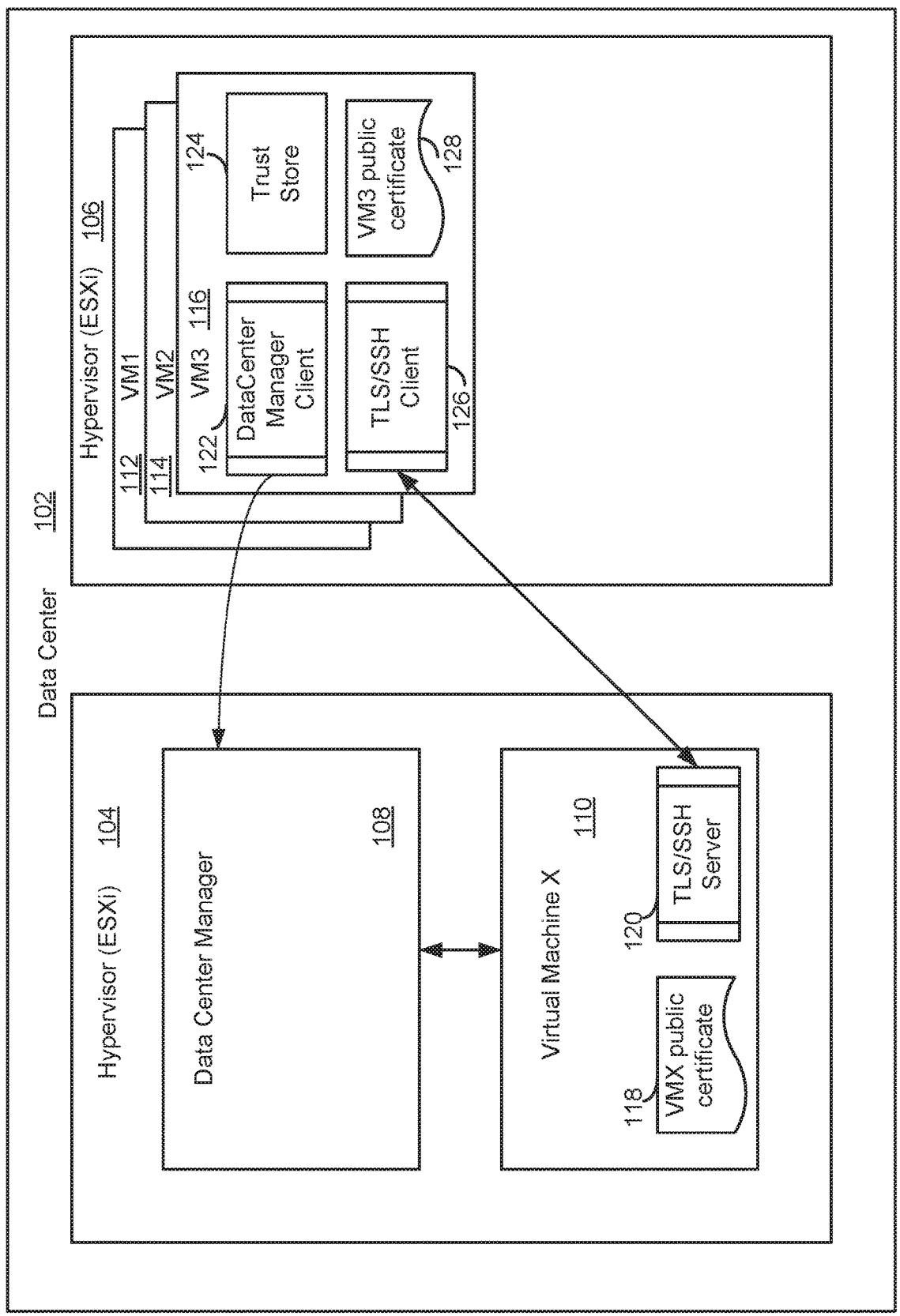
FIG. 1 depicts data center and deployment of a virtual machine.

FIG. 1 depicts data center and deployment of a virtual machine. A data center 102 includes a hypervisor 104 and a hypervisor 106 for supporting virtual machines such as virtual appliances. Hypervisor 104 supports a data center manager 108, which may be a virtual machine, along with a virtual machine, virtual machine X (VMX) 110. Hypervisor 106 supports a number of virtual machines VM1 112, VM2 114, VM3 116. VM3 116 includes a data center manager client process 122, a trust store 124, a TLS/SSH client process 126 and a VM3 public digital certificate 128. VMX 110, which is the machine deployed in the data center at the request of VM3 116, includes a VMX public certificate 118 and a TLS/SSH server process 120. VMX 110 is configured to operate as a TLS/SSH server to VM3 116 which is configured to operate as a TLS/SSH client.

Figure 2:
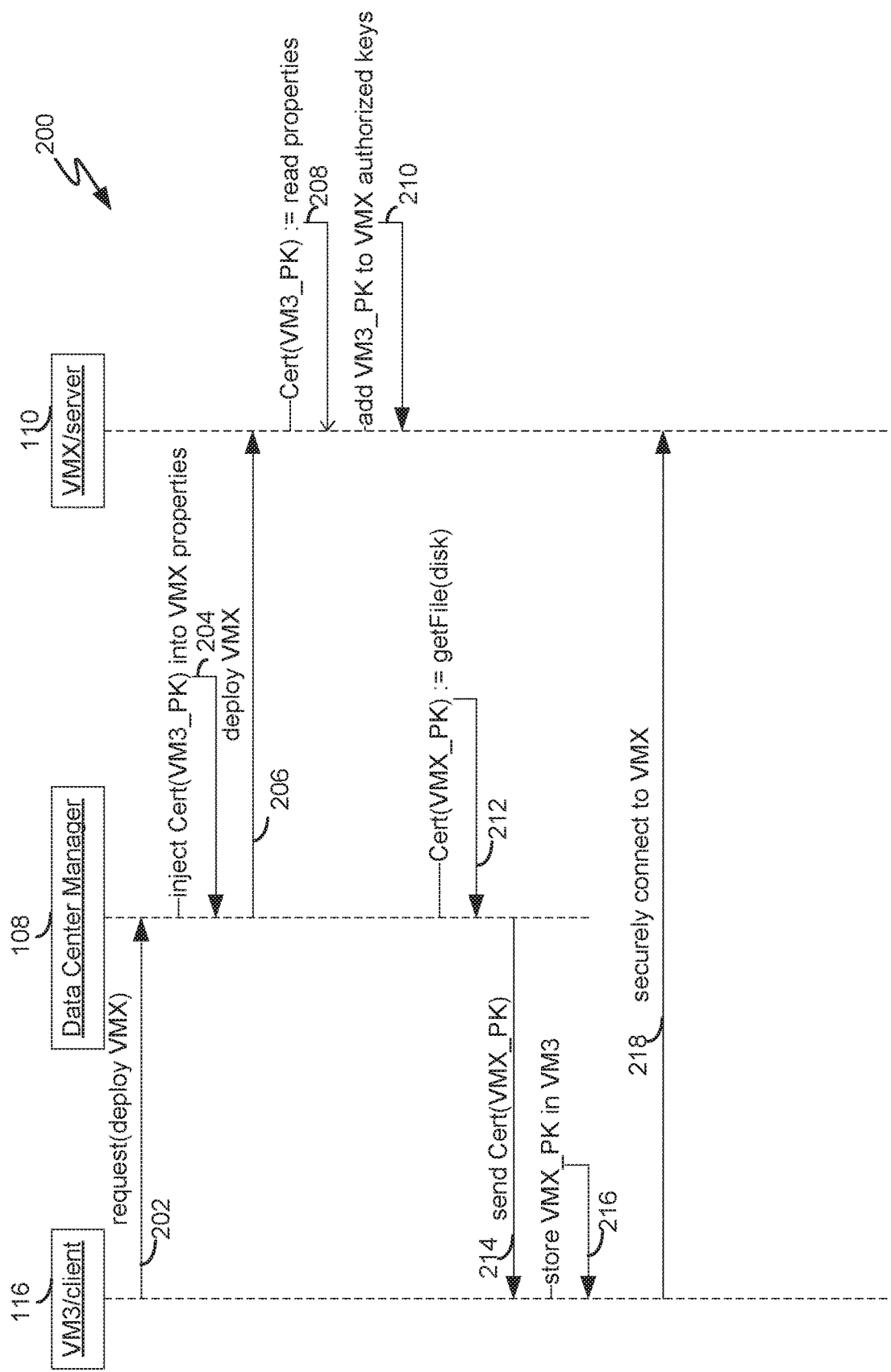
FIG. 2 depicts a sequence diagram for deployment of a virtual machine according to an embodiment.

FIG. 2 depicts a sequence diagram 200 for deployment of a virtual machine according to an embodiment. Execution of steps 202-218 assumes that it is possible to inject secrets into a virtual machine to be deployed and to retrieve arbitrary files from the virtual machine's virtual disk. In step 202, VM3 116 requests the deployment of VMX 110. In step 204, data center manager 108 injects the public digital certificate for VM3 116 into a properties attribute of VMX 110. The public digital certificate contains, among other data items, a public key for VM3 116 along with the issuer's digital signature to establish authenticity of the public key. In step 206, data center manager 108 deploys VMX 110 to run on hypervisor 104. In step 208, the VMX 110 reads its properties attributes and obtains the injected public digital certificate. In step 210, VMX 110 adds its public key to the set of authorized VMX keys. In step 212, data center manager 108 reads an accessible disk file of VMX 110 and obtains the public digital certificate of VMX 110 and in step 214, sends the certificate to VM3 116. In step 216, VM3 116 stores locally the public key for VM3 116. In step 218, VM3 116 establishes a secure connection with VMX 110 using the VMX public key. At this point, VM3 116 has the public key for VMX 110 and VMX 110 has the public key for VM3 116 so that a symmetric secret session key can be established for communication between VMX 110 and VM3 116.

Figure 3:
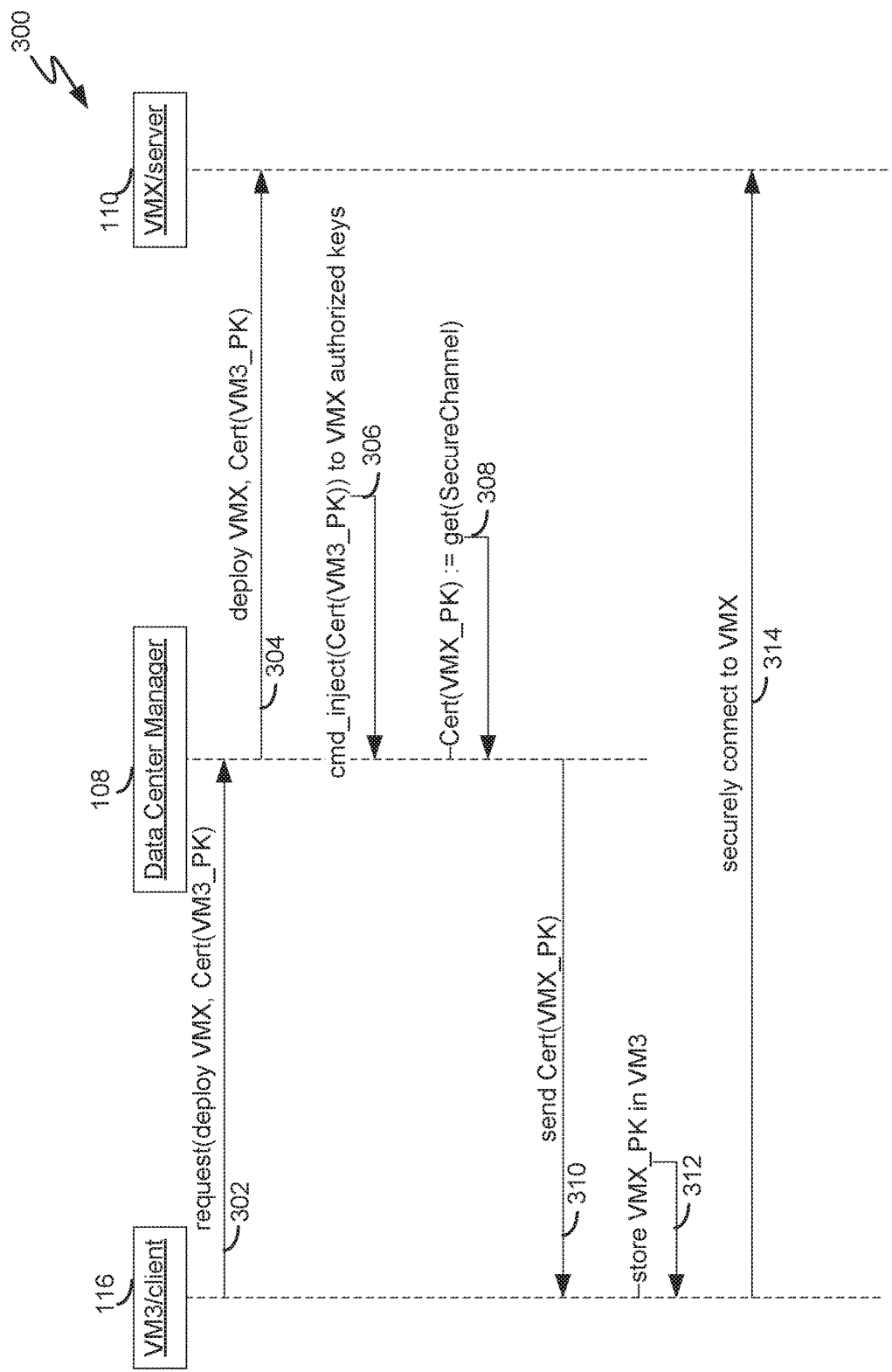
FIG. 3 depicts a sequence diagram for deployment of a virtual machine according to an embodiment.

FIG. 3 depicts a sequence diagram 300 for deployment of a virtual machine according to an embodiment. Execution of steps 302-318 assumes that it is possible to execute arbitrary commands in the deployed virtual machine's environment and it is possible to retrieve arbitrary files from the virtual machine's disk. In step 302, VM3 116 request deployment of VMX 110. In step 304, data center manager 108 deploys VMX 110 along with its public digital certificate. In step 306, data center manager 108, performs a command that injects the public digital certificate for VM3 116 into the authorized keys for VMX 110. In step 308, using a secure channel, data center manager 108 obtains the public digital certificate for VMX 110. In step 310, the data center manager 108 sends the obtained digital public certificate to VM3 116. In step 312, VM3 116 locally stores the public key for VMX 110. In step 314, VM3 116 establishes a secure connection with VMX 110 using the VMX public key. At this point, VMX 110 has the public key for VM3 116 and VM3 116 has the public key for VMX 110 so that a symmetric secret session key can be established for communication between VMX 110 and VM3 116.

Figure 4:
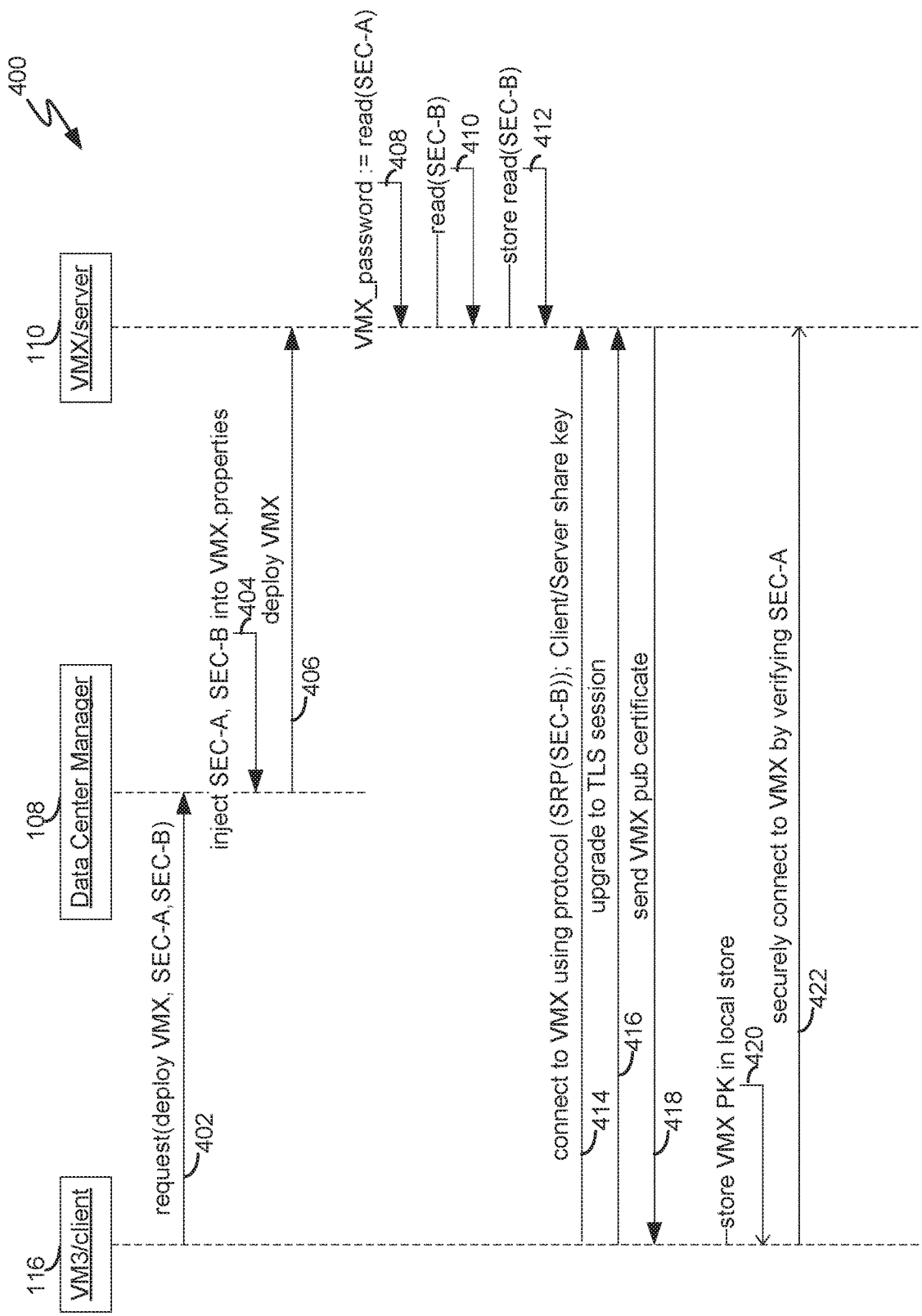
FIG. 4 depicts a sequence diagram for deployment of a virtual machine according to an embodiment.

FIG. 4 depicts a sequence diagram for deployment of a virtual machine according to an embodiment. Execution of steps 402-422 assume that it is possible to execution arbitrary commands in the virtual machine's environment and it is possible to retrieve arbitrary files from the virtual machine's disk. In step 402, VM3 116 requests to deploy VMX 110 and includes secret A (SEC-A) and secret B (SEC-B). In step 404, data center manager 108 injects SEC-A and SEC-B into the properties attribute of VMX 110. In step 406, data center manager 108 deploys VMX 110. In step 408, VMX 110 reads SEC-A and sets its password to SEC-A. In step 410, VMX 110 reads SEC-B and in step 412 stores SEC-B locally. In step 414, VM3 116 connects with VMX 110 using a type of password-authenticated key agreement (PAKE) protocol, such as the Secure Remote Password (SRP) protocol, e.g., SRP-6. The SRP protocol is a variant of Diffie-Hellman key agreement protocol based on weak secrets (e.g., passwords) and results in each participant sharing a symmetric secret session key. Thus, at this point, both VMX 110 and VM3 116 share a symmetric secret session key. In step 416, the connection between VM3 116 and VMX 110 is upgraded to a TLS session in one embodiment. The protocol in TLS has two layers, a record protocol, which encapsulates higher-level protocols and handles reliability, confidential and compression of messages exchanged over the connection, and a handshake protocol, which is responsible for setting up a secure channel between participants (server VMX and client VM3) and providing the keys and algorithm information to the record protocol. Thus, the TLS session provides security features such as identification, authentication, confidentiality and integrity for the communication between VMX and VM3. In step 418, VMX 110 sends its public digital certificate to VM3 116, which is verified by VM3 to establish a secure connection. In step 420, VM3 116 stores locally the public key for VMX 110 and in step 422, VM3 116 provides SEC-A over the secure connection which is verified by VMX to authenticate VM3's identity.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for establishing a mutually authenticated secure connection between a first and second virtual machine to be deployed in a datacenter, comprising:
   receiving a request to deploy the second virtual machine in the data center;
   in response to receiving the request, deploying the second virtual machine along with a public digital certificate of the first virtual machine;
   informing the first virtual machine of a public digital certificate of the second virtual machine; and
   establishing a mutually authenticated secure connection between the first and second virtual machines using the public digital certificate of the first virtual machine and the public digital certificate of the second virtual machine.

2. The method of claim 1, further comprising:
   injecting the public digital certificate of the first virtual machine into property attributes of the second virtual machine, wherein:
   deploying the second virtual machine along with the public digital certificate of the first virtual machine comprises deploying the second virtual machine with the property attributes of the second virtual machine containing the public digital certificate of the first virtual machine, wherein the second virtual machine obtains a public key of the first virtual machine from the property attributes.

3. The method of claim 1, further comprising:
   using a command to inject the public digital certificate of the first virtual machine into authorized keys of the second virtual machine.

4. The method of claim 1, wherein informing the first virtual machine of the public digital certificate of the second virtual machine includes:
   obtaining the public digital certificate of the second virtual machine from a disk file of the second virtual machine; and
   sending the public digital certificate of the second virtual machine to the first virtual machine.

5. The method of claim 1, wherein informing the first virtual machine of the public digital certificate of the second virtual machine includes:

obtaining the public digital certificate of the second virtual machine from a secure channel; and sending the public digital certificate of the second virtual machine to the first virtual machine.

6. A method for establishing a mutually authenticated secure connection between a first and second virtual machine to be deployed in a datacenter, comprising:

receiving a request to deploy the second virtual machine in the data center, the request including a first secret value and a second secret value;

in response to receiving the request, injecting the first and second secret values into property attributes of the second virtual machine prior to deploying the second virtual machine; and in response to receiving the request, deploying the second virtual machine with the property attributes of the second virtual machine containing the first and second secret values, wherein the second virtual machine reads the first secret value from the property attributes of the second virtual machine and saves the first secret value as a password of the second virtual machine and the second virtual machines reads the second secret value;

wherein the first virtual machine connects to the second virtual machine using a password key agreement protocol to establish a secure connection between the first and second virtual machines, using a session key established by the password key agreement protocol;

wherein the first virtual machine upgrades the secure connection to a TLS session and receives a public digital certificate from the second virtual machine; and wherein first virtual machine establishes a mutually authenticated secure connection between first virtual machine and the second virtual machine after verifying the second secret value.

7. A non-transitory computer readable medium containing instructions for establishing a mutually authenticated secure connection between a first and second virtual machine to be deployed in a datacenter, which when executed by one or more processors performs the steps of:

receiving a request to deploy the second virtual machine in the data center;

in response to receiving the request, deploying the second virtual machine along with a public digital certificate of the first virtual machine;

informing the first virtual machine of a public digital certificate of the second virtual machine; and establishing a mutually authenticated secure connection between the first and second virtual machines using the public digital certificate of the first virtual machine and the public digital certificate of the second virtual machine.

8. The non-transitory computer readable medium of claim 7, further comprising:

injecting the public digital certificate of the first virtual machine into property attributes of the second virtual machine, wherein:

deploying the second virtual machine along with the public digital certificate of the first virtual machine comprises deploying the second virtual machine with the property attributes of the second virtual machine containing the public digital certificate of the first virtual machine, wherein the second virtual machine obtains a public key of the first virtual machine from the property attributes.

9. The non-transitory computer readable medium of claim 7, further comprising:

using a command to inject the public digital certificate of the first virtual machine into authorized keys of the second virtual machine.

10. The non-transitory computer readable medium of claim 7, wherein informing the first virtual machine of the public digital certificate of the second virtual machine includes:

obtaining the public digital certificate of the second virtual machine from a disk file of the second virtual machine; and sending the public digital certificate of the second virtual machine to the first virtual machine.

11. The non-transitory computer readable medium of claim 7, wherein informing the first virtual machine of the public digital certificate of the second virtual machine includes:

obtaining the public digital certificate of the second virtual machine from a secure channel; and sending the public digital certificate of the second virtual machine to the first virtual machine.

12. A computer system comprising:

a first hypervisor supporting a first virtual machine; and a second hypervisor supporting a data management virtual machine;

wherein the data management virtual machine is configured to:

receive a request to deploy a second virtual machine in the data center onto the second hypervisor;

in response to receiving the request, deploy the second virtual machine along with a public digital certificate of the first virtual machine;

inform the first virtual machine of a public digital certificate of the second virtual machine; and establish a mutually authenticated secure connection between the first and second virtual machines using the public digital certificate of the first virtual machine and the public digital certificate of the second virtual machine.

13. The computer system of claim 12, wherein the data management virtual machine is further configured to:

inject the public digital certificate of the first virtual machine into property attributes of the second virtual machine, wherein:

to deploy the second virtual machine along with the public digital certificate of the first virtual machine comprises to deploy the second virtual machine with the property attributes of the second virtual machine containing the public digital certificate of the first virtual machine, wherein the second virtual machine obtains a public key of the first virtual machine from the property attributes.

14. The computer system of claim 12, wherein the data management virtual machine is further configured to:

use a command to inject the public digital certificate of the first virtual machine into authorized keys of the second virtual machine.

15. The computer system of claim 12, wherein being configured to inform the first virtual machine of the public digital certificate of the second virtual machine includes being configured to:

obtain the public digital certificate of the second virtual machine from a disk of the second virtual machine; and send the public digital certificate of the second virtual machine to the first virtual machine.

16. The computer system of claim 12, wherein being configured to inform the first virtual machine of the public digital certificate of the second virtual machine includes being configured to:
    obtain the public digital certificate of the second virtual machine from a secure channel; and
    send the public digital certificate of the second virtual machine to the first virtual machine.

* * * * *